United States Patent
Patel et al.

(10) Patent No.: US 9,094,126 B2
(45) Date of Patent: Jul. 28, 2015

(54) QOS-AWARE UNITED CONTROL PROTOCOL FOR OPTICAL BURST SWITCHING IN SOFTWARE DEFINED OPTICAL NETWORKS

(71) Applicant: NEC Laboratories America, Inc., Princeton, NJ (US)

(72) Inventors: Ankitkumar N. Patel, East Brunswick, NJ (US); Philip Nan Ji, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 111 days.

(21) Appl. No.: 13/998,535

(22) Filed: Nov. 7, 2013

(65) Prior Publication Data

US 2014/0178066 A1  Jun. 26, 2014

Related U.S. Application Data

(60) Provisional application No. 61/723,637, filed on Nov. 7, 2012.

(51) Int. Cl.
*H04B 10/27* (2013.01)
*H04Q 11/00* (2006.01)

(52) U.S. Cl.
CPC .............. *H04B 10/27* (2013.01); *H04Q 11/00* (2013.01)

(58) Field of Classification Search
None
See application file for complete search history.

(56) References Cited

U.S. PATENT DOCUMENTS

| | | | |
|---|---|---|---|
| 6,137,793 A * | 10/2000 | Gorman et al. | 370/360 |
| 2007/0086474 A1* | 4/2007 | Lee et al. | 370/447 |

OTHER PUBLICATIONS

D. Zhang, L. Liu, L. Hong, H. Gou, T. Tsuritani, J. Wu, and 1. Morita, "Experimental Demonstration of OBS/WSON Multi-Layer Optical Switched Networks with an OpenFlow-based Unified Control Plane," Proc. Of ONDM, pp. 1-6, Apr. 2012.*

* cited by examiner

*Primary Examiner* — Faruk Hamza
*Assistant Examiner* — Alan Lindenbaum
(74) *Attorney, Agent, or Firm* — Joseph Kolodka

(57) ABSTRACT

The present invention is directed to a QoS-aware unified protocol that is applicable in the control plane of software defined networks, which can bring following benefits and includes optical burst switching protocol mainly requires four key operations; burst assembling, burst routing, burst scheduling, and control packet signaling protocols.

20 Claims, 4 Drawing Sheets

QOS-AWARE UNITED CONTROL PROTOCOL FOR OPTICAL BURST SWITCHING IN SOFTWARE DEFINED OPTICAL NETWORKS

RELATED APPLICATION INFORMATION

This application claims priority to provisional application Ser. No. 61/723,637 filed on Nov. 7, 2012, the contents thereof are incorporated herein by reference.

BACKGROUND

The present invention relates optical communications, and, more particularly, to Quality of Service QoS-aware unified control protocol for optical burst switching in software defined optical networks.

The following background documents are discussed in the present application: [VVokkarane] V. Vokkarane, "Design and Analysis of Architecture and Protocols for Optical Burst-Switched Networks," *Ph.D. Dissertation, UT-Dallas*, June 2004; [[PPedroso]] P. Pedroso, J. Perello, M. Klinkowski, D. Careglio, S. Spadaro, and J. Sole-Pareta, "A GMPLS/OBS Network Architecture Enabling QoS-Aware End-to-End Burst Transport," *Proc. of HPSR*, 2011; [SDas] S. Das, G. Parulkar, and N. McKeown, "Unified Packet and Circuit Switched Networks," *Proc. of IEEE GLOBECOM Workshop*, pp. 1-6, December 2009; [DZhang] D. Zhang. L. Liu, L. Hong, H. Gou, T. Tsuritani, J. Wu, and I. Morita, "Experimental Demonstration of OBS/WSON Multi-Layer Optical Switched Networks with an OpenFlow-based Unified Control Plane," *Proc. of ONDM*, pp. 1-6, April 2012; [Ychen] Y. Chen, M. Hamdi, and D. Tsang, "Proportional QoS over OBS Networks," *Proc. of IEEE GLOBECOM*, pp. 1510-1514, December 2001.

Among the optical circuit, packet, and burst switching technologies, optical circuit switching offers course switching granularity, and has large round trip latency in a connection setup. On the other hand, optical packet switching has a large buffer requirement, complicated control, and synchronization requirements [VVokkarane]. Optical Burst Switching (OBS) is a promising technology for future optical networks, which offers an intermediate solution by leveraging benefits of packet switching such as statistical multiplexing over high-speed optical transmission. OBS offers finer switching granularity of traffic with lower complexity and higher resource efficiency.

Generalized Multi-protocol Label Switching (GMPLS) is one such distributed unified control plane protocol that has been extensively investigated to support optical burst switching in the previous studies [PPedroso]; however, this protocol is overly complicated and fragile. In spite of an existence of mature GMPLS technologies, network operators are reluctant in deploying such technologies in commercial networks. Furthermore, GMPLS is defined just over existing IP/MPLS networks and may not be capable of incorporating everything in a homogeneous protocol suite [SDas]. Thus, GMPLS may not offer unified control plane infrastructure.

Recently, Software-Defined Network (SDN) architecture is introduced in which control planes are extracted from the data planes of physical hardware, and these control planes of heterogeneous devices are aggregated in the centralized controller. A controller communicates with the data planes of devices through an open protocol such as OpenFlow. The protocol extracts a common set of functionalities for heterogeneous switching granularity across multiple layers. The control plane decisions taken by the controller are represented in terms of a set of actions, rules, and policies, and those are cached in the data planes of physical hardware. Thus, the same data plane can support heterogeneous protocols and switching granularity. On the other hand, the controller abstracts the common-map of data planes across multiple layers while hiding the implementation details, and thus, offers virtualization. Therefore, SDN architecture enables control protocols that can simultaneously manage, control, and operate multiple layers with heterogeneous switching granularity. Such architecture enables more flexibility in hardware selections, shorter time to implement new technologies and products, more efficient and reliable automatic unified control, and optimized utilization of network resources.

An optical burst switching protocol mainly requires four key operations; burst assembling, burst routing, burst scheduling, and control packet signaling. In distributed protocols, burst assembling, burst routing, and burst scheduling operations are performed at every edge node independently based on the local network state information, and control packet signaling is performed hop-by-hop in a distributed manner.

On the other hand, in software-defined networks, burst assembling, burst routing, and scheduling operations can be performed at the centralized controller to optimize the network performance using the global network state information. The control plane decisions taken at the controller can be cached simultaneously in the programmable data plane using OpenFlow protocol. Thus, open issues in realizing OBS over SDN are how to perform burst assembling, burst routing, and burst scheduling operations in a centralized controller, and how to enhance the OpenFlow protocol to support OBS over SDN, such that network performance is enhanced.

Looking at prior efforts by others, in [DZhang], OpenFlow protocol is enhanced to support OBS over SDN, and the realization of OBS over SDN is demonstrated through experiments. However, the burst assembling and burst scheduling operations are performed at edge nodes using legacy protocols in the proposed solution in [DZhang]. The burst assembling, routing, and scheduling solutions are not yet investigated in the OpenFlow based SDN architecture.

Accordingly, there is a need for QoS-aware unified control protocol for optical burst switching in software defined optical networks.

SUMMARY OF THE INVENTION

A computer implemented method for Quality of service QoS aware unified control protocol for optical burst switching in software defined networks includes employing an adaptive burst assembling protocol for providing network state information and application latency requirements, using a latency aware burst routing for determining burst routing and scheduling while observing a wavelength continuity restraint responsive to said adaptive burst assembling protocol, utilizing OpenFlow protocol extensions for realizing a QoS aware unified control protocol for optical burst switching OBS; and carrying out the QoS aware unified control protocol for performing burst routing and burst scheduling operations using the latency-aware burst routing, estimating a burst size for future arrival of traffic using the burst estimation.

In an alternative aspect of the same invention, there is provided a system for implementing for Quality of service QoS aware unified control protocol for optical burst switching in software defined networks including an adaptive burst assembling protocol for providing network state information and application latency requirements, a latency aware burst routing for determining burst routing and scheduling while observing a wavelength continuity restraint responsive to said adaptive burst assembling protocol, an OpenFlow protocol extensions for realizing a QoS aware unified control protocol for optical burst switching OBS, and a QoS aware unified control protocol for performing burst routing and burst scheduling operations using the latency-aware burst routing, estimating a burst size for future arrival of traffic using the burst estimation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
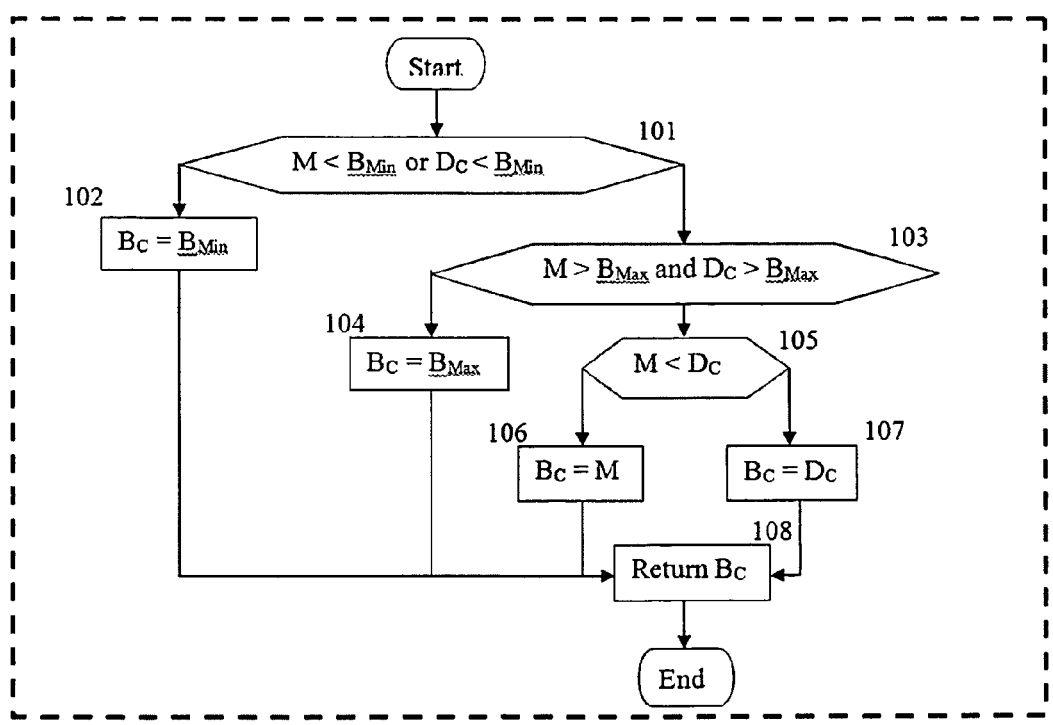
FIG. 1 is a diagram of an adaptive-burst estimation procedure in with the invention.

The present invention is directed to a QoS-aware unified protocol that is applicable in the control plane of software defined networks, which can bring following benefits: i) QoS-aware unified protocol reduces burst blocking probability, ii) QoS-aware unified protocol reduces connection setup time for optical burst switching, iii) QoS-aware unified protocol reduces packet latency, iv) QoS-aware unified protocol increases network throughput, v) QoS-aware unified protocol offers better quality of service for different classes of traffic with heterogeneous latency requirements. The invention employs an inventive burst assembling, burst routing, and burst scheduling protocols that are executed as applications in the centralized controller.

Optical burst switching protocol mainly requires four key operations; burst assembling, burst routing, burst scheduling, and control packet signaling protocols. Here, we propose a novel QoS-aware unified control protocol that consists of an adaptive-burst assembling, latency-aware burst routing and scheduling, and OpenFlow based signaling protocols those are described as follows.

(A) Adaptive Burst Assembling Protocol

Different applications have heterogeneous latency requirements. For example, voice-over-IP, online gaming, video conference, and IPTV applications require smaller packet latency compared to email, online backups, and software download applications. An edge node classifies this traffic into different Forwarding Equivalent Classes (FEC) based on their latency requirements. Conventionally, many QoS provisioning policies have been investigated to form a burst and treat each class of traffic separately [YChen]. However, these schemes are executed only at edge nodes those do not have the global knowledge of network states.

In this protocol, the centralized controller maintains the network state information such as the network connectivity and wavelength occupancy information centrally. We assume that time is slotted, and the wavelength occupancy state in a given time slot is represented by a binary variable. Thus, the occupancy information of each wavelength is represented by a binary bitmap in which '1' denotes that the wavelength is available in a time slot, and '0' denotes that the wavelength is occupied.

In the inventive adaptive-burst assembling protocol, bursts are assembled at edge nodes while the burst size is estimated at the controller. The controller estimates the burst size based on available network resources and the latency requirement $L_C$ of a traffic class C using the burst estimation procedure. Let Z denotes the burst configuration time that is defined as $Z=(2*T_{CN}^E*D_{CN}^E)+T_{ODC}+T_{OXC}$, where $T_{CN}^E$ denotes the OpenFlow control message propagation latency per unit distance between the controller CN and an edge node E, $D_{CN}^E$ denotes the distance between the controller CN and an edge node E. $T_{ODC}$ is the control packet processing time at the centralized controller, and $T_{OXC}$ is the upper bound of optical cross-connect configuration time. Thus, the burst configuration time is independent of the route length. Let, $B_{Min}$ and $B_{max}$ denote the maximum and minimum allowed burst sizes, and $B_C$ denotes the estimated burst size of a class C. The burst estimation procedure constraints the burst size between $B_{Min}$ and $B_{Max}$ since very small burst size increases the control plane overhead while very large burst size may not be supported at the edge node due to the buffer capacity limitations.

The burst estimation procedure in the controller first estimates a burst size based on the network state information. The procedure pre-calculates K-alternate shortest routes between each source-destination pair. For a given OBS connection between a pair of edge nodes, the procedure finds a bit-map of each wavelength along the K-alternate shortest routes connecting the pair of edge nodes. The bit-map of a wavelength along a route is derived by performing logical end operations of wavelength occupancy states of the same wavelength of all links along the route in each time slot. In the found bit-maps, a set of available void islands X is searched in a time interval $Z \le t \le L_C$, where a void island is defined as a set of consecutive available time slots. If the average size of found void islands X is denoted as $S_{Avg}$, then $M=(S_{Avg}*Y)/P_{Avg}$ denotes the estimated burst size based on the network state information, where Y and $P_{Avg}$ denote channel capacity in a time slot and an average packet size respectively. The reason for considering the average size of found void islands during this estimation process is the higher likelihood of an availability of a void island with an average size in near future.

The burst estimation procedure also estimates a burst size based on the application latency requirements. If the packets of class C are buffered since $L_C$-Z units of time or in other words the buffered packets of class C are just the configuration time away by meeting their latency deadline, then the burst size is estimated to be the size of class C buffer denoted as $D_C$.

If both the estimated burst sizes, M and $D_C$ are greater than $B_{Max}$, then the procedure returns the burst size $B_{Max}$. On the contrary, if either M or $D_C$ is smaller than $B_{Min}$, then the procedure returns the burst size $B_{Min}$. If both, M and $D_C$ are in between $B_{Min}$ and $B_{Max}$, then the procedure returns the smallest estimated burst size among M and $D_C$.

The controller piggybacks the estimated burst size of class C with the burst release message of class C that is sent from a controller to the source edge node. The source edge node generates the next burst of a class C with this estimated size, and piggybacks the current buffer state information of class C, such as the buffer size and the waiting time of the oldest packet in the buffer, with the burst establishment message of class C to the controller. Thus, the procedure adapts the burst size based on the network state and latency requirement of applications.

At step 101: The procedure compares the estimated buffer size based on the network state information M and current buffer size $D_C$ with $B_{Min}$. If either M or $D_C$ is smaller than $B_{Min}$, then the procedure performs Step 102, otherwise the procedure performs Step 103. At step 102: The procedure estimates the burst size of $B_{Min}$. At step 103: The procedure compares the estimated buffer size based on the network state information M and current buffer size $D_C$ with $B_{Max}$. If both M and $D_C$ is greater than $B_{Max}$, then the procedure performs Step 104, otherwise the procedure performs Step 105.

In step 104: The procedure estimates the burst size of $\&_{Max}$.

At step 105: The procedure compares the burst size based on the network state information M with the current buffer size $D_C$. If M is smaller than $D_C$, then the procedure follows Step 106, otherwise the procedure follows Step 107. At step 106: The procedure estimates the burst size of M. At step 107: The procedure estimates the burst size of DC. Lastly, at step 108: The procedure returns the estimated burst size.

(B) Latency-Aware Burst Routing and Scheduling

The invention includes a procedure that considers the network state information and application latency requirements in determining burst routing and scheduling while observing the wavelength continuity constraint. Here, we assume that optical nodes are equipped with neither wavelength convertors nor fiber delay lines, and also ignore the deflection routing in the events of burst contentions. Thus, if the procedure fails to find all optical end-to-end connection for the duration of burst transmission, then the burst is considered to be blocked. The procedure first pre-calculates K-alternate shortest routes between each source-destination pairs. Let us consider class C=1; 2; 3; l traffic, and their latency requirements are $L_1 < L_2 < L_3 << L_l$. For the burst routing, the procedure selects a route among the K-alternate shortest routes to balance the load over the network while avoiding over-provisioning of network resources. The procedure finds the bit-map of each wavelength along the K-alternate routes. In the found bit-maps, void islands of at least $(B_{bst}/Y)$ width are searched, and the starting time slot at which the void islands are available are recorded in a set Q, where $B_{bst}$ denotes the size of a burst that needs to be transmitted between source and destination edge nodes. Among the found void islands, a void island is selected such that the probability of scheduling bursts with lower latency requirements is maximized for future arrival of traffic while satisfying the latency requirement of the current burst.

Figure 2:
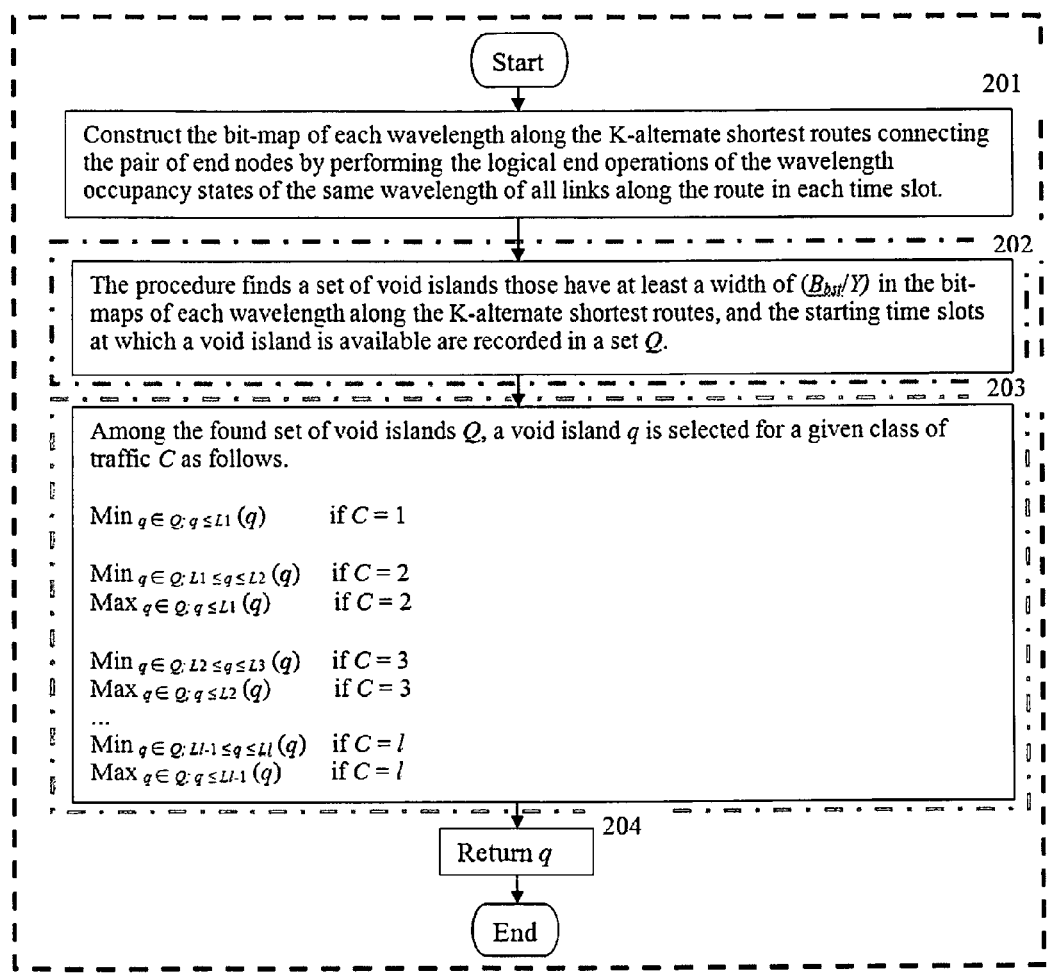
FIG. 2 is a diagram of latency aware burst routing and scheduling in accordance with the invention.

The latency-aware burst routing and scheduling procedure is presented in FIG. 2 and described in details as follows.

Initially, at step 201: The procedure determines the bit-map of each wavelength along the pre-calculated K-alternate shortest paths connecting the source and destination end nodes by performing the logical end operations of the wavelength occupancy states of the same wavelength of all links along the route in each time slot. Then at step 202: The procedure finds a set of void islands those have at least a width of $(B_{bst}/Y)$ in the bit-maps of each wavelength along the K-alternate shortest routes, and the starting time slots at which the void islands are available are recorded in a set Q. in the following step 203:

Among the found set Q of void islands, the procedure selects a void island q for a given class of traffic C as follows:

$$\text{Min}_{q \,\in Q; q \leq L1} (q) \quad \text{if } C = 1$$

$$\text{Min}_{q \,\in Q; L1 \leq q \leq L2} (q) \quad \text{if } C = 2$$

$$\text{Max}_{q \,\in Q; q \leq L1} (q) \quad \text{if } C = 2$$

$$\text{Min}_{q \,\in Q; L2 \leq q \leq L3} (q) \quad \text{if } C = 3$$

$$\text{Max}_{q \,\in Q; q \leq L2} (q) \quad \text{if } C = 3$$

$$\ldots$$

$$\text{Min}_{q \,\in Q; Ll-1 \leq q \leq Ll} (q) \quad \text{if } C = l$$

$$\text{Max}_{q \,\in Q; q \leq Ll-1} (q) \quad \text{if } C = l$$

Lastly, at step 204: The procedure returns the time slot q at which a void island of the sufficient size is available.

(C) QoS-Aware Unified OBS Protocol

In optical burst switching, upon the formation of a burst at the edge node for each forwarding equivalent class (FEC), a burst establishment message is sent to a controller using OpenFlow protocol over a secure dedicated channel. The controller performs the burst routing and burst scheduling operations using the latency-aware burst routing and scheduling procedure, and also estimates the burst size for future arrival of traffic using the burst estimation procedure. These operations are performed using the global network state information, such as the network connectivity and wavelength occupancy information, and the latency requirements of applications. The controller sends an acknowledgement with the estimated burst size of the FEC in the burst release message to the source edge node. Additionally, the controller sends the cross-connection entries of an optical circuit for a scheduled duration in the burst configuration message to all nodes along the selected route. Upon an acceptance of a burst release message from the controller, an edge node forwards the burst after the specified offset time all-optically to the other edge node. This requires applications of the proposed enhancements to OpenFlow protocol, and a development of burst assembling and burst scheduling applications in the controller to offer OBS functionalities over SDNs.

Figure 3:
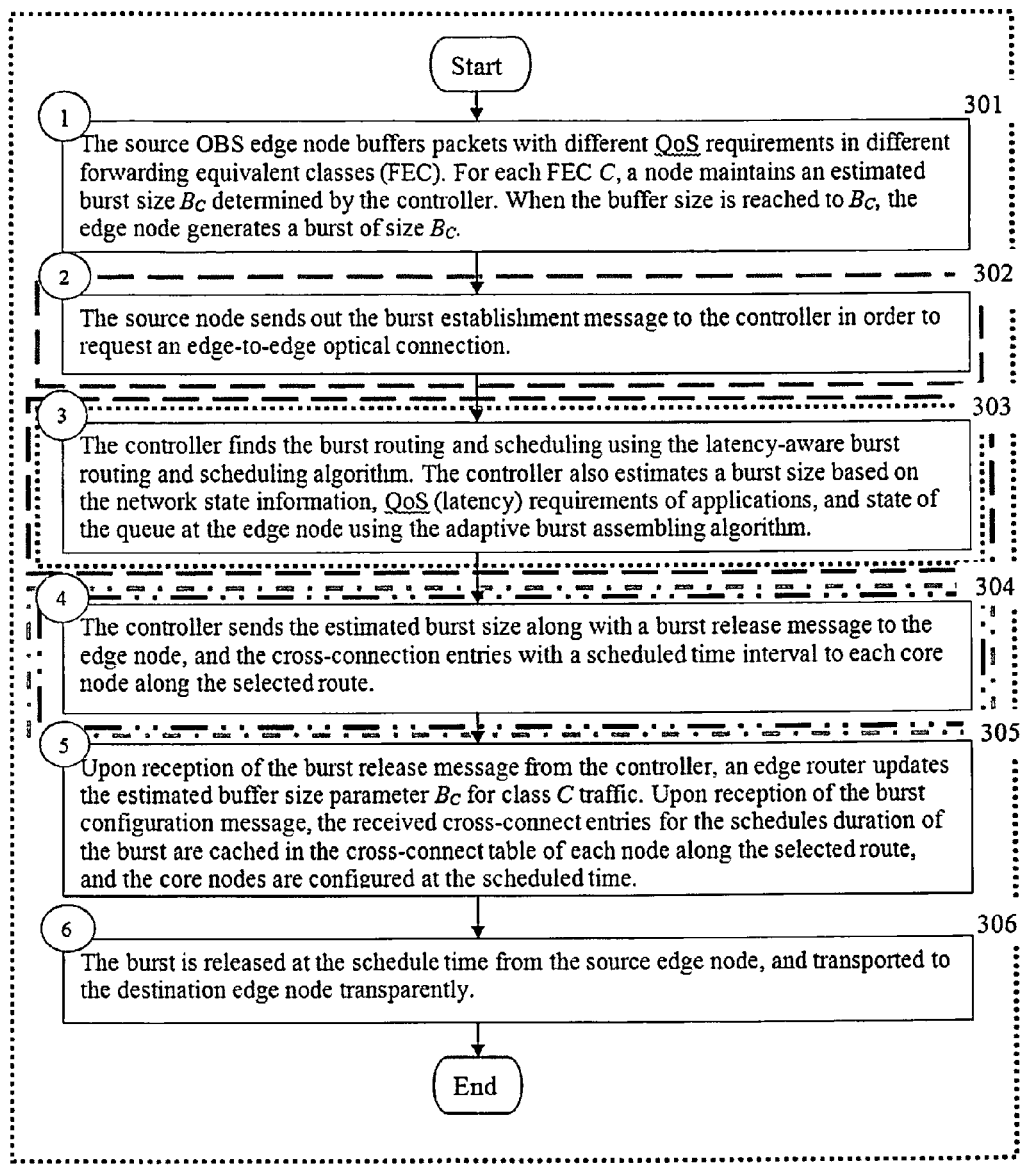
FIG. 3 is a diagram QoS aware unified protocol, in accordance with the invention.
Figure 4:
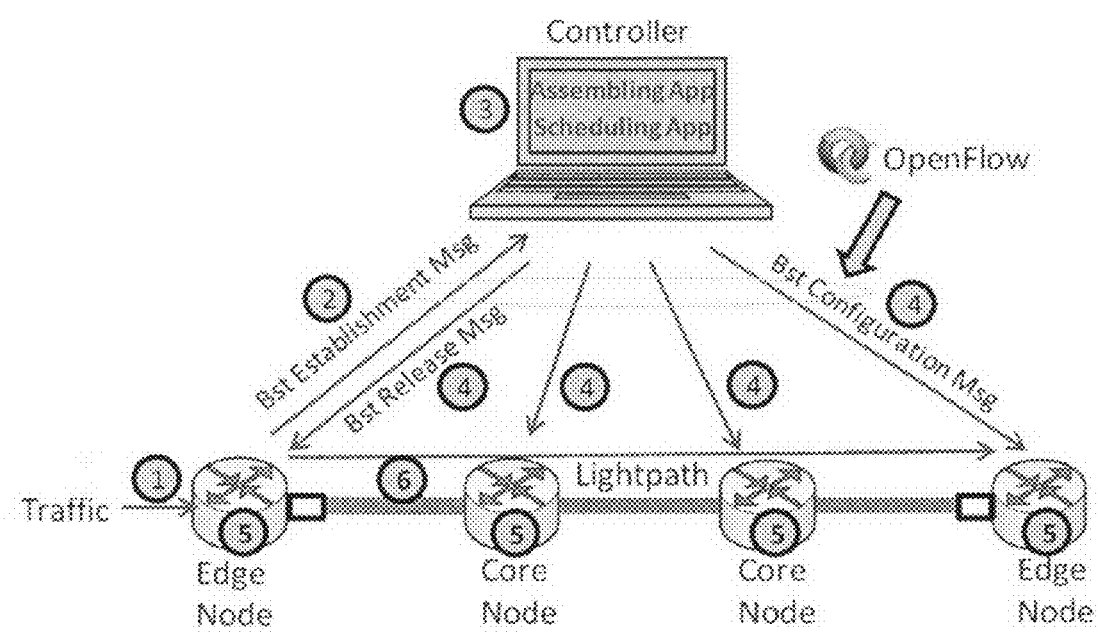
FIG. 4 is a diagram of QoS-aware unified control protocol for OBS over SDN, in accordance with the invention.

The QoS-aware unified OBS protocol is presented in FIG. 3, demonstrated in FIG. 4, and described in detail as follows:

Initially at step 301: Upon arrival packets at the edge node, the protocol buffers packets with different QoS requirements in different forwarding equivalent classes (FEC) at the edge node. For each FEC C, a node maintains the estimated burst size $B_C$ determined by the controller. When the buffer size is reached to $B_C$, the protocol generates a burst of size $B_C$. Then in step 302: The protocol sends out the burst establishment message from the source edge node to the controller in order to request an edge-to-edge optical connection. In the next step 303: The controller finds the burst scheduling using the latency-aware burst routing and scheduling algorithm. The controller also estimates a burst size based on the network state information, QoS requirement of a burst, and state of the queue at the edge node using the adaptive burst assembling algorithm. In the next step 304: The controller sends the estimated burst size along with a burst release message to the edge node, and the cross-connection entries with a scheduled time interval to each core node along the selected route. Then in step 305: Upon reception of the burst release message from the controller, an edge router updates the estimated buffer size parameter $B_C$ for class C traffic. The received cross-connect entries for the schedules duration of the burst are cached in the cross-connect table of each node along the selected route, and the core nodes are configured at the scheduled time. Lastly, in step 306: The burst is released at the schedule time from the source edge node, and transported to the destination edge node transparently.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for Quality of service QoS aware unified control protocol for optical burst switching in software defined networks comprising the steps of:
  employing an adaptive burst assembling protocol for providing network state information and application latency requirements;
  using a latency aware burst routing for determining burst routing and scheduling while observing a wavelength continuity restraint responsive to said adaptive burst assembling protocol;
  utilizing OpenFlow protocol extensions for realizing a QoS aware unified control protocol for optical burst switching OBS;
  pre-calculating K-alternate shortest routes between a plurality of source-destination pairs;
  determining an occupancy bit-map of each wavelength along the pre-calculated K-alternate shortest paths by performing the logical end operations of the wavelength occupancy states of the same wavelength of all links along the route in each time slot;
  finding a set of consecutive available time slots (void islands) with at least a width of $(B_{bst}/Y)$ in an occupancy bit-map of each wavelength along K-alternate shortest routes, and starting time slots at which void islands are available where $B_{bst}$ denotes a size of a burst to be transmitted between source and destination edge nodes and where Y denotes channel bandwidth in a time slot; and
  selecting a void island based on the width for a given class of traffic for carrying out the QoS aware unified control protocol for performing burst routing and burst scheduling operations using the latency-aware burst routing, estimating a burst size for future arrival of traffic using the burst estimation.

2. The method of claim 1, wherein the QoS aware unified control protocol comprises a controller with operations performed using global network state information, including the network connectivity and wavelength occupancy information, and the latency requirements of applications.

3. The method of claim 1, wherein the QoS aware unified control protocol comprises a controller for sending an acknowledgement with an estimated burst size of a forward equivalent classes FEC in a burst release message to a source edge node.

4. The method of claim 1, wherein the QoS aware unified control protocol comprises a controller for sending the cross-connection entries of an optical circuit for a scheduled duration in the burst configuration message to all nodes along the selected route, upon an acceptance of a burst release message from the controller, an edge node forwarding the burst after the specified offset time all-optically to the other edge node requiring applications of proposed enhancements to OpenFlow protocol, and a development of burst assembling and burst scheduling applications in the controller to offer optical burst switching OBS functionalities over software defined networks SDNs.

5. The method of claim 1, wherein the QoS aware unified control protocol comprises a source OBS edge node that buffers packets with different QoS requirements in different forwarding equivalent classes (FEC), for each FEC C a node maintaining an estimated burst size $B_C$ determined by a controller and when a buffer size is reached to $B_C$, the edge node generates a burst of size $B_C$.

6. The method of claim 5, wherein the QoS aware unified control protocol comprises a source node that sends out a burst establishment message to the controller in order to request an edge-to-edge optical connection.

7. The method of claim 6, wherein the QoS aware unified control protocol comprises a controller that finds the burst routing and scheduling using the latency-aware burst routing and scheduling and the controller also estimates a burst size based on the network state information, QoS (latency) requirements of applications, and state of the queue at the edge node using the adaptive burst assembling.

8. The method of claim 7, wherein the QoS aware unified control protocol comprises the controller sending the estimated burst size along with a burst release message to the edge node, and the cross-connection entries with a scheduled time interval to each core node along the selected route.

9. The method of claim 8, wherein the QoS aware unified control protocol comprises where upon reception of the burst release message from the controller, an edge router updates the estimated buffer size parameter $B_C$ for class C traffic, upon reception of the burst configuration message, the received cross-connect entries for the schedules duration of the burst are cached in the cross-connect table of each node along the selected route, and the core nodes are configured at the scheduled time.

10. The method of claim 9, wherein the QoS aware unified control protocol comprises the burst being released at a schedule time from the source edge node, and transported to the destination edge node transparently.

11. A system for implementing for Quality of service QoS aware unified control protocol for optical burst switching in software defined networks comprising:
  an adaptive burst assembling protocol for providing network state information and application latency requirements;
  a latency aware burst routing for determining burst routing and scheduling while observing a wavelength continuity restraint responsive to said adaptive burst assembling protocol;
  an OpenFlow protocol extensions for realizing a QoS aware unified control protocol for optical burst switching OBS; and
  a QoS aware unified control protocol for performing burst routing and burst scheduling operations using the latency-aware burst routing, estimating a burst size for future arrival of traffic using the burst estimation, pre-calculating K-alternate shortest routes between a plurality of source-destination pairs; determining an occupancy bit-map of each wavelength along the pre-calculated K-alternate shortest paths by performing the logical end operations of the wavelength occupancy states of the same wavelength of all links along the route in each time slot; finding a set of consecutive available time slots (void islands) with at least a width of $(B_{bst}/Y)$ in an occupancy bit-map of each wavelength along K-alternate shortest routes, and starting time slots at which void islands are available where $B_{bst}$ denotes a size of a burst to be transmitted between source and destination edge nodes and where Y denotes channel bandwidth in a time slot; and selecting a void island based on the width for a given class of traffic.

12. The system of claim 11, wherein the QoS aware unified control protocol comprises a controller with operations performed using global network state information, including the network connectivity and wavelength occupancy information, and the latency requirements of applications.

13. The system of claim 11, wherein the QoS aware unified control protocol comprises a controller for sending an acknowledgement with an estimated burst size of a forward equivalent classes FEC in a burst release message to a source edge node.

14. The system of claim 11, wherein the QoS aware unified control protocol comprises a controller for sending the cross-connection entries of an optical circuit for a scheduled duration in the burst configuration message to all nodes along the selected route, upon an acceptance of a burst release message from the controller, an edge node forwarding the burst after the specified offset time all-optically to the other edge node requiring applications of proposed enhancements to Open-Flow protocol, and a development of burst assembling and burst scheduling applications in the controller to offer optical burst switching OBS functionalities over software defined networks SDNs.

15. The system of claim 11, wherein the QoS aware unified control protocol comprises a source OBS edge node that buffers packets with different QoS requirements in different forwarding equivalent classes (FEC), for each FEC C a node maintaining an estimated burst size $B_C$ determined by a controller and when a buffer size is reached to $B_C$, the edge node generates a burst of size $B_C$.

16. The system of claim 15, wherein the QoS aware unified control protocol comprises a source node that sends out a burst establishment message to the controller in order to request an edge-to-edge optical connection.

17. The system of claim 16, wherein the QoS aware unified control protocol comprises a controller that finds the burst routing and scheduling using the latency-aware burst routing and scheduling and the controller also estimates a burst size based on the network state information, QoS (latency) requirements of applications, and state of the queue at the edge node using the adaptive burst assembling.

18. The system of claim 17, wherein the QoS aware unified control protocol comprises the controller sending the estimated burst size along with a burst release message to the edge node, and the cross-connection entries with a scheduled time interval to each core node along the selected route.

19. The system of claim 18, wherein the QoS aware unified control protocol comprises where upon reception of the burst release message from the controller, an edge router updates the estimated buffer size parameter $B_C$ for class C traffic, upon reception of the burst configuration message, the received cross-connect entries for the schedules duration of the burst are cached in the cross-connect table of each node along the selected route, and the core nodes are configured at the scheduled time.

20. The system of claim 19, wherein the QoS aware unified control protocol comprises the burst being released at a schedule time from the source edge node, and transported to the destination edge node transparently.

* * * * *